(12) United States Patent
Bhaskar et al.

(10) Patent No.: US 8,745,754 B2
(45) Date of Patent: Jun. 3, 2014

(54) DEVICE FOR SECURE ACCESS TO DIGITAL MEDIA CONTENTS, VIRTUAL MULTI-INTERFACE DRIVER AND SYSTEM FOR SECURE ACCESS TO DIGITAL MEDIA CONTENTS

(75) Inventors: Rao B S Bhaskar, Bangalore (IN); Rajan G. High Court, Tamil nadu (IN); Josephine G. Deepa, Pondicherry (IN)

(73) Assignee: SCM Microsystems GmbH, Ismaning (DE)

( * ) Notice: Subject to any disclaimer, the term of this patent is extended or adjusted under 35 U.S.C. 154(b) by 1584 days.

(21) Appl. No.: 10/573,147

(22) PCT Filed: Sep. 22, 2004

(86) PCT No.: PCT/EP2004/010640
§ 371 (c)(1),
(2), (4) Date: May 5, 2008

(87) PCT Pub. No.: WO2005/029388
PCT Pub. Date: Mar. 31, 2005

(65) Prior Publication Data
US 2008/0209571 A1 Aug. 28, 2008

(30) Foreign Application Priority Data
Sep. 23, 2003 (DE) .................................. 203 14 722

(51) Int. Cl.
*G06F 21/00* (2013.01)
(52) U.S. Cl.
USPC ........ 726/27; 726/9; 726/18; 726/20; 726/26; 713/165; 713/185; 713/186; 713/193

(58) Field of Classification Search
None
See application file for complete search history.

(56) References Cited

U.S. PATENT DOCUMENTS

| | | | |
|---|---|---|---|
| 4,646,305 | A | 2/1987 | Tretter et al. |
| 4,924,516 | A | 5/1990 | Bremer et al. |
| 4,960,982 | A | 10/1990 | Takahira |
| 5,131,025 | A | 7/1992 | Hamasaki |
| 5,224,166 | A | 6/1993 | Hartman, Jr. |

(Continued)

FOREIGN PATENT DOCUMENTS

| | | |
|---|---|---|
| EP | 1049012 A2 | 11/2000 |
| WO | WO 98/07255 | 2/1998 |

(Continued)

OTHER PUBLICATIONS

Driscoll, Edward C.; Fowler, Randall C. A Comparison of Centralized Versus Distributed Architectures in Biometric Access Control Systems. Proceedings 1989 International Carnahan on Security Technology. Pub. Date: 1989. Relevant pp. 193-198. Found on the World Wide Web at: http://ieeexplore.ieee.org/stamp/stamp.jsp?tp=&arnumber=751978.*

(Continued)

*Primary Examiner* — Cordelia Zecher
*Assistant Examiner* — Jeremiah Avery
(74) *Attorney, Agent, or Firm* — Proskauer Rose LLP

(57) ABSTRACT

A device for secure access to digital media contents, the device comprising an access means for accessing digital media contents from a data source and a reader for authenticating a user, the authentication being performed by checking some authentication data. An internal communication path between the access means and the reader is not directly accessible from outside the device.

15 Claims, 6 Drawing Sheets

(56) References Cited

U.S. PATENT DOCUMENTS

| | | | |
|---|---|---|---|
| 5,396,617 A * | 3/1995 | Villwock et al. | 710/62 |
| 5,848,231 A | 12/1998 | Borza et al. | |
| 5,872,834 A | 2/1999 | Teitelbaum | |
| 5,952,641 A | 9/1999 | Korshun | |
| 6,011,858 A | 1/2000 | Davis et al. | |
| 6,016,476 A | 1/2000 | Sedivy et al. | |
| 6,035,403 A | 3/2000 | Subbiah et al. | |
| 6,041,412 A * | 3/2000 | Timson et al. | 726/3 |
| 6,088,802 A * | 7/2000 | Bialick et al. | 726/3 |
| 6,357,005 B1 | 3/2002 | Devaux et al. | |
| 6,473,861 B1 * | 10/2002 | Stokes | 713/193 |
| 6,694,436 B1 * | 2/2004 | Audebert | 726/9 |
| 6,898,709 B1 * | 5/2005 | Teppler | 713/178 |
| 6,938,164 B1 * | 8/2005 | England et al. | 713/193 |
| 6,948,069 B1 * | 9/2005 | Teppler | 713/178 |
| 6,989,732 B2 * | 1/2006 | Fisher | 340/3.1 |
| 6,990,684 B2 * | 1/2006 | Futamura et al. | 726/18 |
| 7,003,676 B1 * | 2/2006 | Weber et al. | 713/194 |
| 7,039,952 B2 * | 5/2006 | Bender et al. | 726/9 |
| 7,111,321 B1 * | 9/2006 | Watts et al. | 726/2 |
| 7,114,646 B2 * | 10/2006 | Hillhouse | 235/375 |
| 7,194,768 B2 * | 3/2007 | Kisliakov | 726/20 |
| 7,512,807 B2 * | 3/2009 | Hillhouse | 713/186 |
| 2002/0011516 A1 | 1/2002 | Lee | |
| 2002/0073340 A1 | 6/2002 | Mambakkam et al. | |
| 2002/0188855 A1 * | 12/2002 | Nakayama et al. | 713/186 |

FOREIGN PATENT DOCUMENTS

| | | |
|---|---|---|
| WO | WO 99/52060 | 10/1999 |
| WO | WO 00/11793 | 3/2000 |
| WO | WO 01/88677 | 11/2001 |
| WO | WO 2004/047084 A2 | 6/2004 |

OTHER PUBLICATIONS

PCT International Search Report for PCT/EP2004/010640, international filing date Sep. 22, 2004, 5 pages.
PCT Written Opinion of the International Searching Authority for PCT/EP2004/010640, international filing date Sep. 22, 2004, 7 pages.
Waugh, Tim, "The Linux 2.4 Parallel Port Subsystem," http://web.archive.org/web/20010604235554/kernelnewbies.org/documents/kdoc/parportbook, 2000, pp. 1-71.
Austria Patent Office Search Report received Oct. 6, 2004, 5 pages.
PCT International Preliminary Report and Written Opinion for PCT/EP2004/010640, international filing date Sep. 22, 2004, 9 pages, Apr. 6, 2006.

* cited by examiner

DEVICE FOR SECURE ACCESS TO DIGITAL MEDIA CONTENTS, VIRTUAL MULTI-INTERFACE DRIVER AND SYSTEM FOR SECURE ACCESS TO DIGITAL MEDIA CONTENTS

CROSS REFERENCE TO RELATED APPLICATIONS

This application is a national phase application based on PCT/EP2004/010640, filed on Sep. 22, 2004, and claims the benefit of priority to German Application No. 203 14 722.7, filed Sep. 23, 2003, both of which are expressly incorporated herein by reference.

TECHNICAL FIELD

The present invention relates to a device for secure access to digital media contents. The invention further relates to a virtual multi-interface driver and to a system for secure access to digital media contents.

BACKGROUND

Secured data storage has become a new application for digital media. All digital media do not have in-built security. Hence in order to store bulk data in a secured fashion it is required to add some external security mechanism. Smart card protection is one ideal candidate for such a mechanism as it is one of the most proven technologies for security products.

Media containing embedded smart card controllers have reached the market. Hence it has become a necessity for the device to support smart card commands. But most of the digital media readers available in the market are single interface devices that are mass storage compliant. They cannot directly support the new media with embedded smart card controllers due to their architectural limitation.

BRIEF SUMMARY

In order to prevent unauthorized access to digital media contents and to overcome the above-mentioned architectural limitation of single interface devices, the invention provides a device for secure access to digital media contents from a data source and a reader for authenticating a user. The authentication is performed by checking some authentication data. The device further comprises an internal communication path between the access means and the reader. The communication path is not directly accessible from outside the device.

The invention also provides a virtual multi-interface driver for supporting a device having at least two device functions and being connectable to a host via a single electrical interface. The virtual multi-interface driver reports at least two logical interfaces to a system software of the host. The logical interface includes at least one virtual interface in addition to the single electrical interface.

The invention further provides a system for secure access to digital media contents, comprising a host and the device and the virtual multi-interface driver as recited before.

DETAILED DESCRIPTION OF THE PREFERRED EMBODIMENTS

Figure 1:
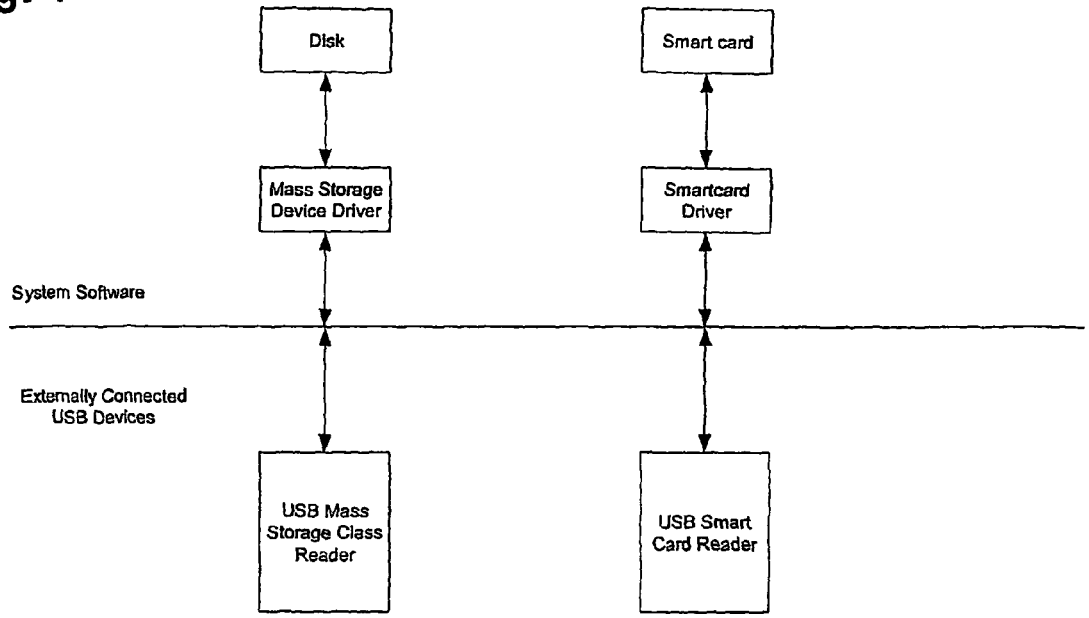
FIG. 1 shows a prior art system including a single interface USB device.

FIG. 1 illustrates a prior art system according to the MSDN Library (under the topic: Windows Driver Stack for Windows XP and LATER). The device shown in FIG. 1 is a single interface USB device that has either a mass storage interface (left part of FIG. 1) or a smart card interface (right part of FIG. 1). The driver loaded for the device is provided by Microsoft Windows OS. Only the functionality of one of the interfaces can be achieved at an instance, depending on whether it is a digital media reader or a smart card reader. This architecture is incapable of supporting a second device function (e.g. a smart card reader in addition to a digital media reader) as the device only has a single physical interface.

Figure 2:
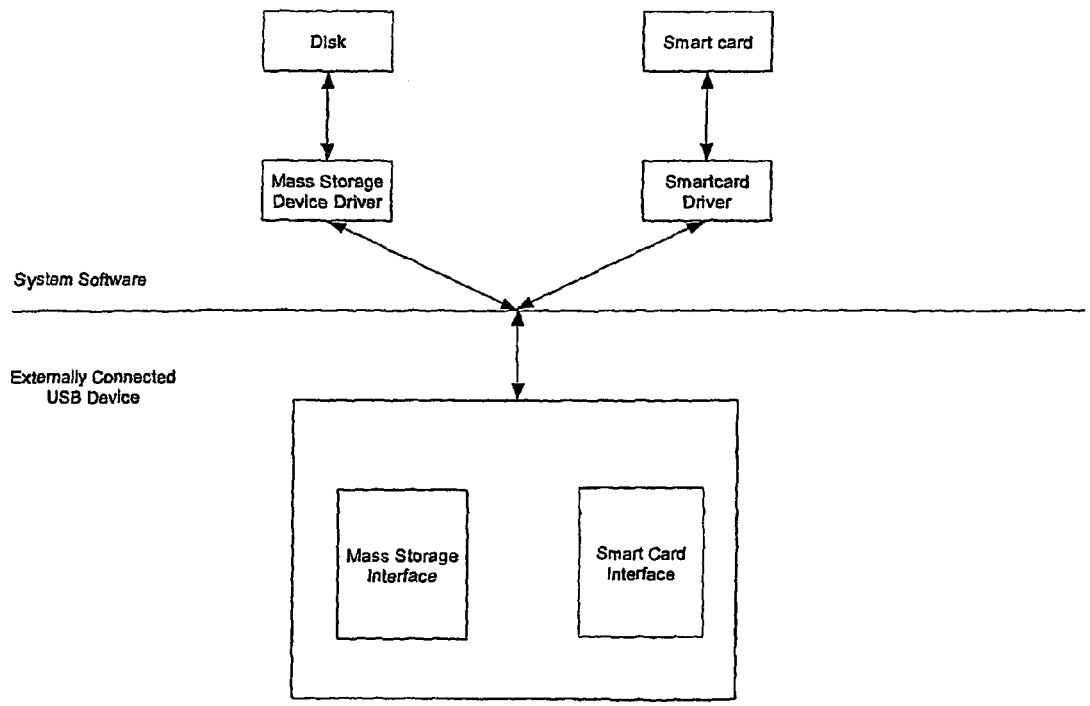
FIG. 2 shows a prior art system including a composite device.

FIG. 2 shows a further prior art system according to the MSDN Library (under the topic: Selecting the Configuration for a Multiple-Interface (Composite) USB Device). The device shown in FIG. 2 is a composite device which has two interfaces defined in its configuration descriptor. One interface is confined to mass storage class and the other interface is confined to the class of smart cards. Both interfaces do physically exist in the device itself (although the device only comprises a single connector). Microsoft Windows OS provided drivers get loaded separately for each interface. The functionalities of both mass storage interface and smart card interface are available. This type of architecture has a limitation in that, for achieving the functionality and the intelligence of a multiple interface device, it is a must that the device itself contains multiple interfaces. Devices with a single physical interface cannot benefit from this architecture. Also, it requires both digital media and the smart card to be present in the reader for communicating with their respective interfaces. Further, this architecture cannot support a single digital medium with a smart card controller embedded within it.

Figure 3:
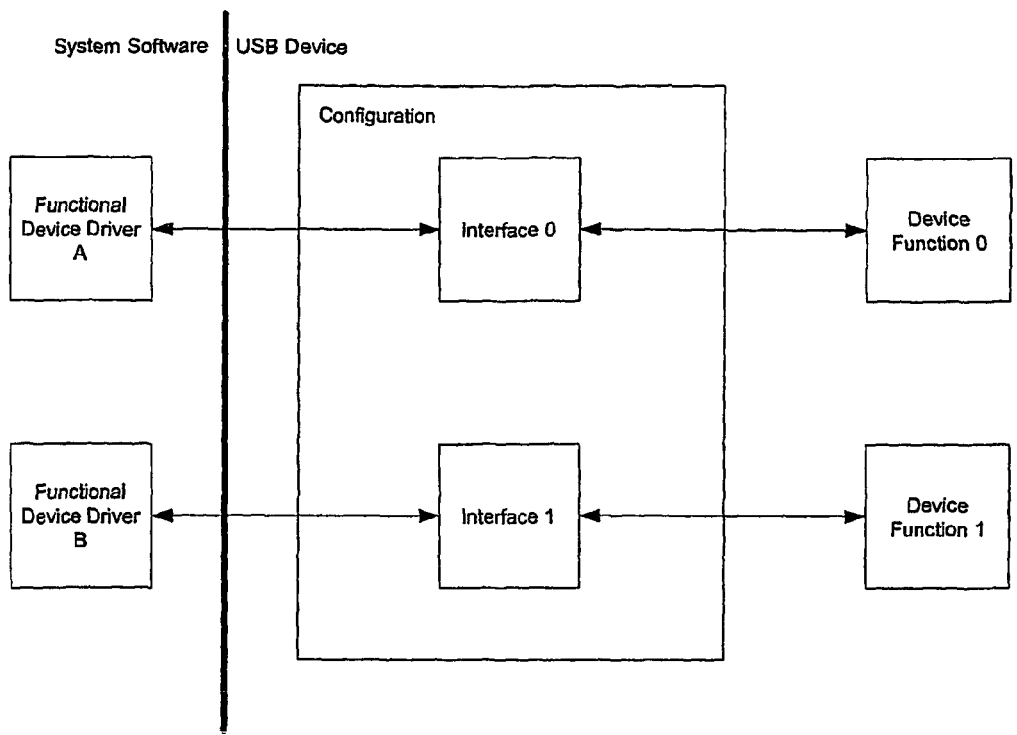
FIG. 3 shows a prior art system according to the core USB framework.

The prior art system illustrated in FIG. 3 also is a system according to MSDN Library (under the topic: Windows Driver Stack for Windows XP and LATER). As can be seen in FIG. 3 the base configuration model assumed by the core USB framework imposes a one-to-one association between an interface and a device function. System software is designed to the intent of the core specification and assumes one driver per function and one interface.

Figure 4:
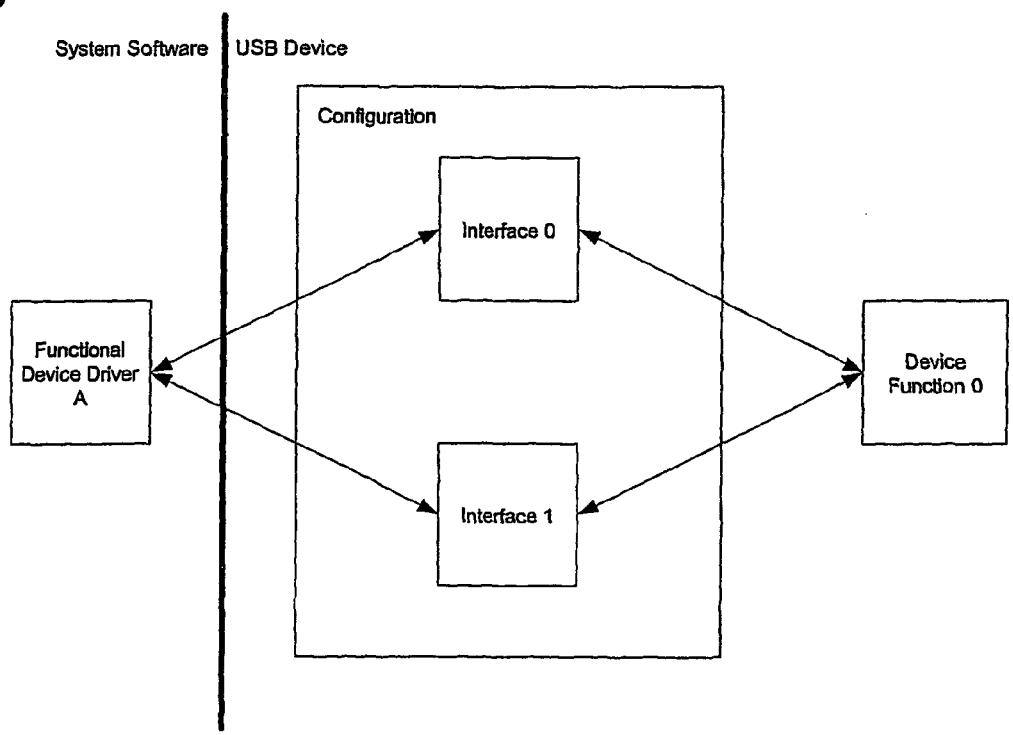
FIG. 4 shows a prior art system according to an extended USB device framework.

The prior art system shown in FIG. 4 is in accordance with an extended USB device framework (see USB Engineering Change Notice, Title: Interface 30 Association Descriptors, applying to Universal Serial Bus Specification, Revision 2.0), defining a new standard descriptor and interface descriptor that allows a device to describe which interfaces are associated with the same device function. This allows the operating system to bind all of the appropriate interfaces to the same driver instance. FIG. 4 shows that device class specifications have defined device functions that use multiple interfaces. A functional driver gets loaded for a device which contains two interfaces (0 and 1), i.e. the model uses one functional driver per function, but binds multiple interfaces to the same driver instance.

Figure 5:
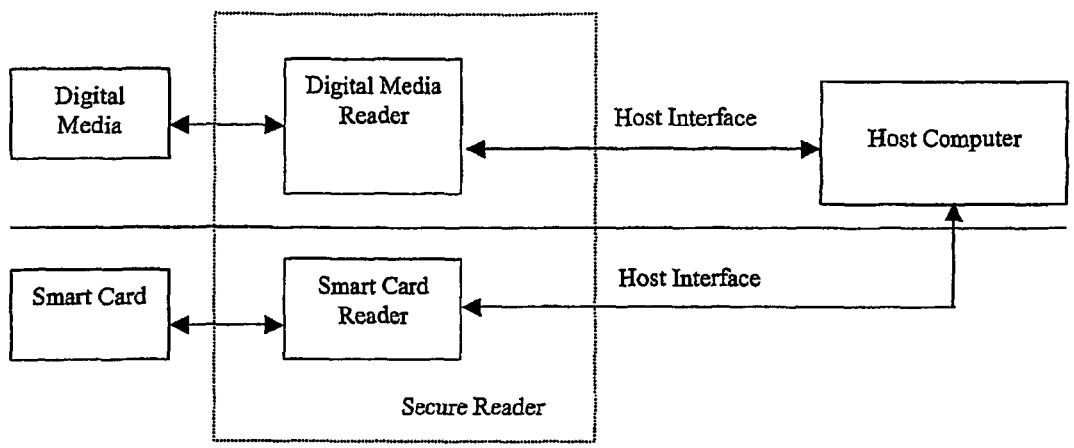
FIG. 5 shows a schematic electrical diagram of a further prior art system.

FIG. 5 shows a prior art system that provides a certain level of security to digital media contents. The system is a hub-based solution that contains both a digital media reader and a smart card reader. The two readers are internally connected to a USB hub that is connected, in turn, to the USB port. Each of the readers has an individual host interface. One of the shortcomings of this solution is that the host computer requires two interfaces, i.e. two USB ports. Another drawback is that the data being sent to the digital media through the digital media reader can be tapped easily at the host interface points. Hence, security is compromised.

Figure 6:
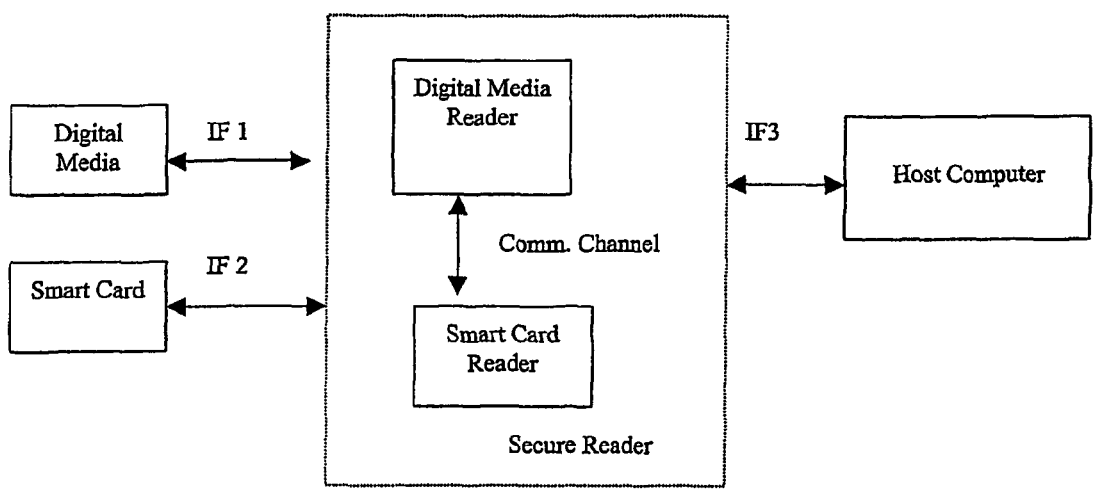
FIG. 6 shows a schematic electrical diagram of a system according to a preferred embodiment of the invention.

FIG. 6 shows a system for secure access to digital media contents according to a preferred embodiment of the invention. The system includes two major components: a device according to the invention, hereinafter referred to as "secure digital media reader", which is connected to a host (a PC, for example), and a "virtual multi-interface driver" according to the invention, which will be described in detail later.

The secure digital media reader includes an access means for accessing digital media contents from a data source, hereinafter referred to as "digital media reader", and a reader for authenticating a user, in particular a smart card reader. The two readers are located in a single external housing. The device can be either accommodated inside the host or be an external unit remote from the host. The digital media reader and the smart card reader may be two independent units or a single integrated unit, i.e. each reader may have its own processor unit.

The digital media reader is the device through which the digital media contents are accessed. The digital media can be interfaced to the digital media reader through any suitable standard interface such as Compact Flash (CF), Smart Media (SM), Secure Digital, Picture Card (xD), Multimedia Card (MMC), etc. (see IF 1 in FIG. 6). The digital media reader can be a module, a system-on-chip (SOC) or a single chip system. The smart card reader communicates with a smart card, which may be embedded inside the smart card reader. On the smart card electronic key information (a digital key) required to access the digital media contents is stored. The smart card can be interfaced to the smart card reader through any suitable standard interface such as ISO 7816, I2C, Contactless Smart Card Interface, etc. (see IF 2 in FIG. 6). The smart card reader can be a module, a system-on-chip (SOC) or a single chip system.

There is an internal communication channel between the smart card reader and the digital media reader. This type of communication is used to guarantee a secure transfer of the digital key from the smart card reader to the digital media reader. It is thus ensured that the digital key is not externally visible for any snooping. The communication channel may also be used to transfer a PIN code to the digital media reader for additional security. In other words, the internal communication channel between the smart card reader and the digital media reader is used to protect the secure data communication within the secure digital media reader to provide a very high level of security.

As can be seen in FIG. 6, only a single data channel between the secure digital media reader and the host is provided, using an electrical industry standard interface, which may be an interface designed for wireless data communication. Suitable interface standards include USB, SCSI, Firewire, WiFi, Bluetooth, HyperLAN.

The digital media contents in the media reader are available to the host only when the correct smart card has been inserted and authenticated. The digital key is not compromised since the key is not transferred through an open channel. Thus, a user cannot access the digital media contents as he does with unsecured digital media. A smart card with a proper digital key stored thereon (optionally in combination with a PIN code entered by means of a PIN pad provided on the device or a keyboard of the host) has to be used to access the digital media content. A mismatch in smart card (or PIN code) will result in denial of authentication to access the media. Thus, only the owner can access the digital media contents.

The invention makes use of a common software layer referred to as "virtual multi-interface driver for secure media.". The virtual multi-interface driver transforms the secure digital media reader into one or more of the following:

a standard mass storage compliant reader, after proper authentication;
  a standard CCID/PCSC compliant smart card reader;
  a secure digital media reader, which shall allow access to digital media contents only on authentication with a smart card. The digital media contents may be partitioned with a secure and an unsecured portion. In this case the secure portion can be accessed only after authentication, while the unsecured portion is always available for access by the user.

The concept of the virtual multi-interface driver according to the invention will now be described. In general, a driver is a software component that acts as an interface between a device and an application software. A multi-interface USB device or a composite USB device has more than one USB interface, e.g. a mass storage class interface and a CCID interface. In other words, a composite device with a mass storage interface and a CCID interface can function both as a mass storage device as well as a smart card reader. A driver that supports more than one USB interface is known as a composite driver. A generic composite driver exposes the multiple interfaces of the device to the application software. This is true only if the device has the capability to have more than one interface.

If the device is incapable to support more than one interface due to its architectural limitation, the virtual multi-interface driver according to the invention can be used to overcome the architectural limitation and still expose the device as a multi-interface device. The virtual driver functions just like any other USB composite driver with additional intelligence to handle the multiple interfaces. Thus, with limited hardware, it is possible to get the complete functionality of composite devices.

Figure 7:
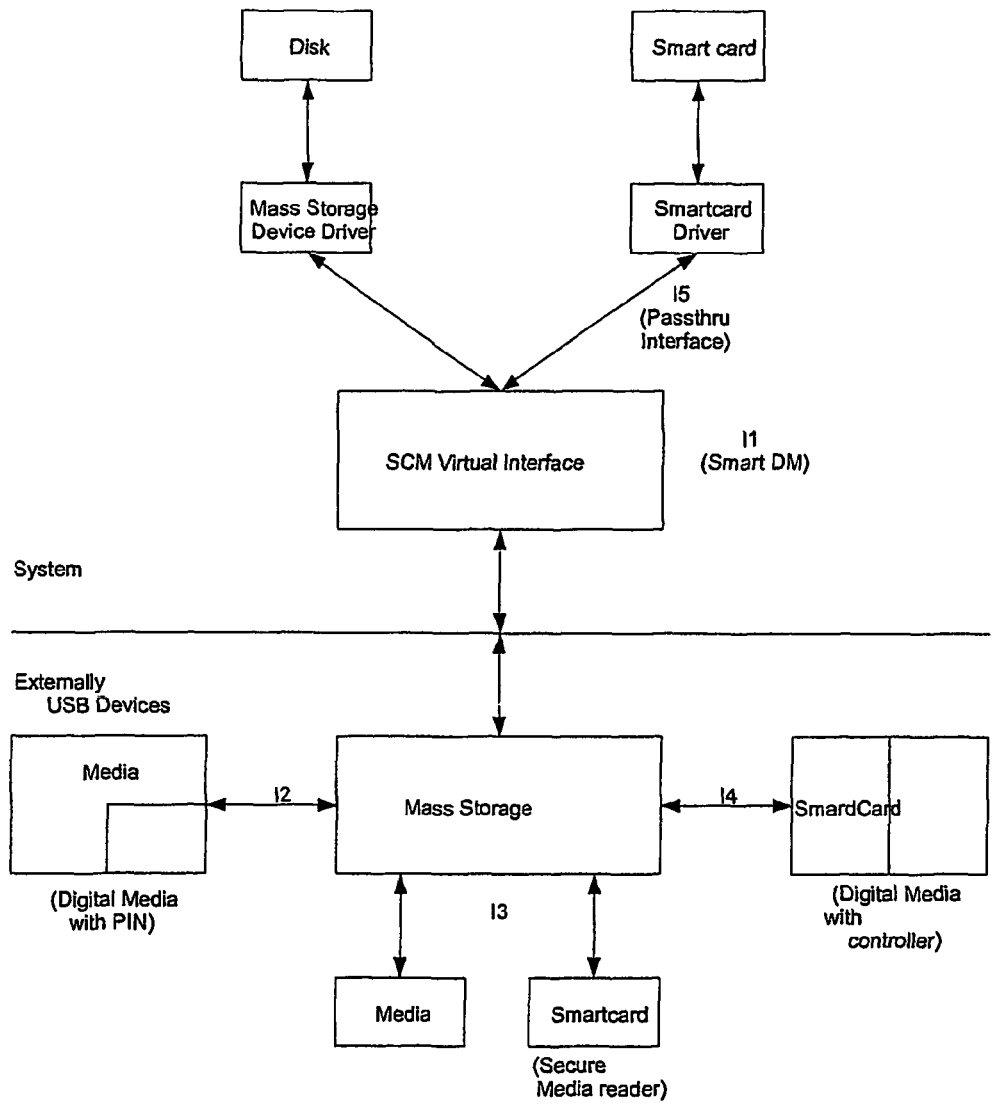
FIG. 7 shows possible application scenarios for the virtual multi-interface driver according to the invention.

FIG. 7 illustrates several possible application scenarios for the virtual multi-interface driver. The device shown in FIG. 7 has a single electrical interface, in particular a mass storage class interface. The virtual multi-interface driver is loaded for the device. It is apparent from the figure that the virtual multi-interface driver reports two logical interfaces to the host. The first logical interface is the mass storage device interface which actually exists in the device; a mass storage driver provided by the operation system of the host (Microsoft Windows, for example) gets loaded for the first interface. The second logical interface is the virtual smart card interface which is created by the virtual multi-interface driver; a smart card driver provided by the operating system of the host gets loaded for the second interface. The virtual multi-interface driver has the intelligence of projecting a single interface as a composite device to the host. The virtual multi-interface driver achieves this by creating a virtual smart card interface in the driver itself. The virtual interface is a logical one and does not physically exist on the secure digital media reader. The host system accepts that there is a mass storage device and a smart card device present in the system.

Figure 8:
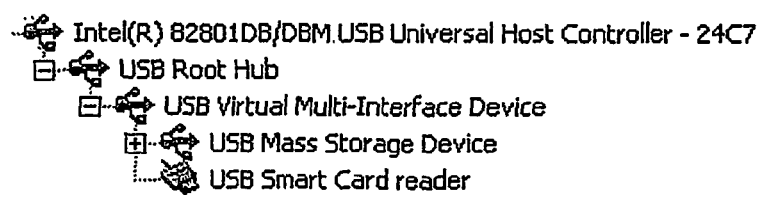
FIG. 8 shows a logical connection diagram of the system according to the preferred embodiment of the invention.
Figure 9:
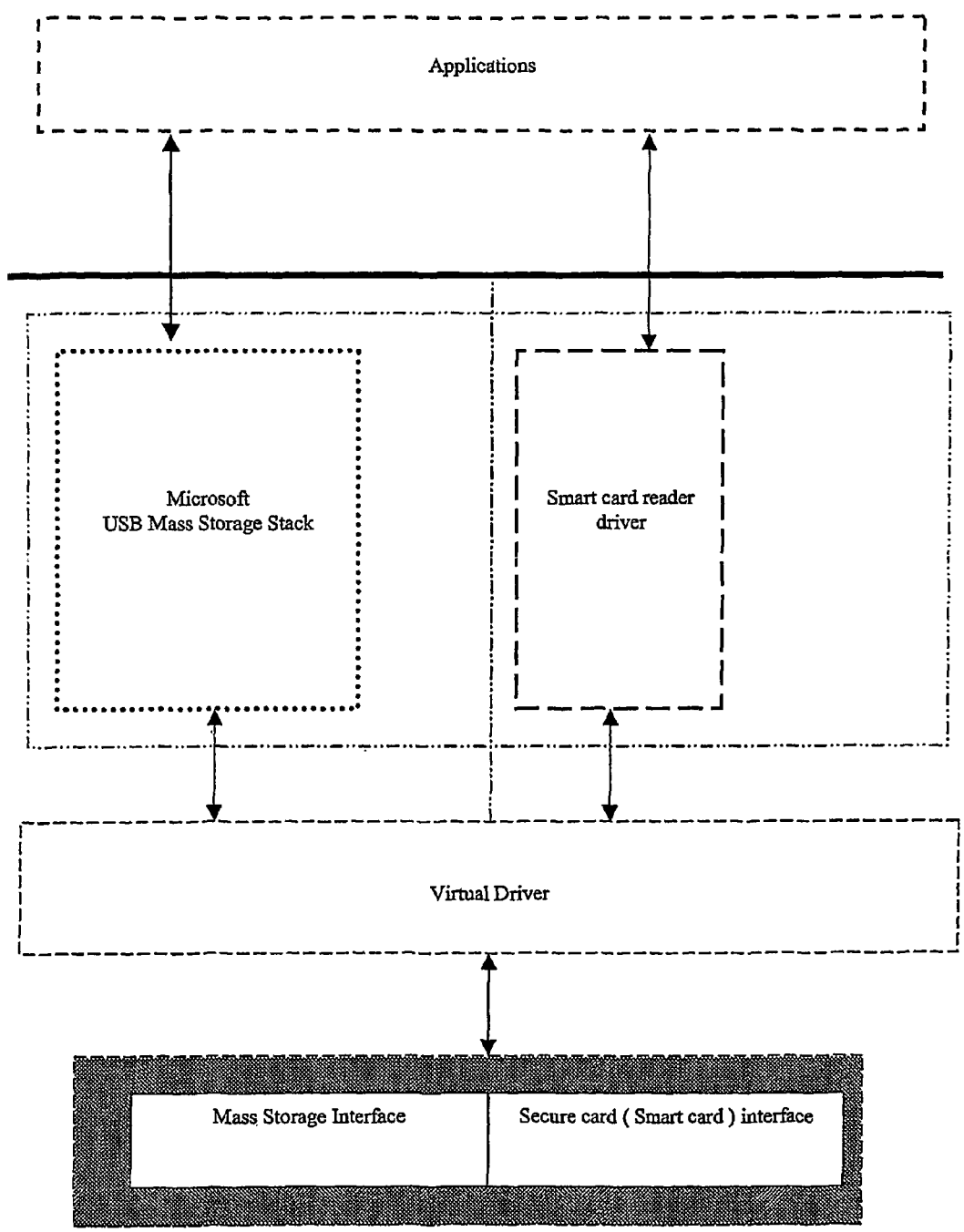
FIG. 9 shows the software architecture of the system according to the preferred embodiment of the invention.

But, according to the logic connection diagram shown in FIG. 8, the smart card reader shown in FIG. 7 is actually a virtual device. Thus, the virtual multi-interface driver successfully emulates a composite device by using a device that is architectured to support only a single interface i.e. only the mass storage interface. A driver letter appears for the mass storage device through which the mass storage device interface can be accessed and the data contents can be read or written from or to the digital medium. To access the smart card interface, any application which is intended for a valid smart card reader can be used. Both interfaces cannot be accessed simultaneously. When the mass storage device interface is in use the smart card interface is locked and vice versa. But it is possible to switch between these interfaces by giving a single command to the device.

The commands received from the mass storage device driver provided by Microsoft Windows OS are in SCSI command format and are directed to the device as such. This is the function of the mass storage device interface portion of virtual multi-interface driver. The commands received from the smart card driver provided by Microsoft Windows OS are in smart card command format. The virtual multi-interface driver converts smart card command format to SCSI command format and directs the converted commands to the device (see I5 in FIG. 7).

Reference is now made to application I2 shown in FIG. 7 (digital media with PIN support). The virtual multi-interface driver supports Windows log-on through a digital media that supports PIN. During log-on the user will be prompted to enter a PIN. Once this happens the PIN which the user has entered is compared with the PIN stored in the digital media. If the match is found, the user will be allowed to log on to Windows through this media.

Regarding application I3 shown in FIG. 7 (secure digital media reader), the virtual multi-interface driver supports a secure digital media reader according to the invention. The user who wants to access the contents of the digital media should correctly enter the key stored in the smart card. The secure digital media reader thus avoids tampering of critical data stored on the digital medium.

Regarding application I4 shown in FIG. 7 (digital media with smart card controller) the virtual multi-interface driver supports access to the digital media with an embedded smart card controller. The device, which is a mediator between the driver and the media, needs to support only a single electrical interface. Since the virtual multi-interface driver has the intelligence of creating virtual logical interfaces, both mass storage commands and smart card commands received from the host can be handled perfectly. This application of the virtual multi-interface driver gives the user a "look and feel" of using both a smart card reader as well as mass storage reader.

The above-described application scenarios show that the virtual multi-interface driver is not only capable of supporting a device according to the invention in order to read digital media contents which are at least partially secured by a smart card, but also provides backward compatibility for existing media.

FIG. 8 further illustrates the software architecture of the system according to the preferred embodiment of the invention. The virtual multi-interface driver is actually a composite driver above which two separate functional drivers (upper interface specific software layers, which are normally shipped with the operating system) get loaded, one for each interface. If there are more than two interfaces provided by virtual multi-interface driver, then so many functional drivers win get loaded above the virtual multi-interface driver. The requests from the application layer are routed to the upper interface specific software layers. These requests are sent to the virtual multi-interface driver. The virtual multi-interface driver just routes the commands to the device and helps to maintain synchronization with the application. Using the operating system provided drivers helps to maintain the application level compatibility.

Figure 10:
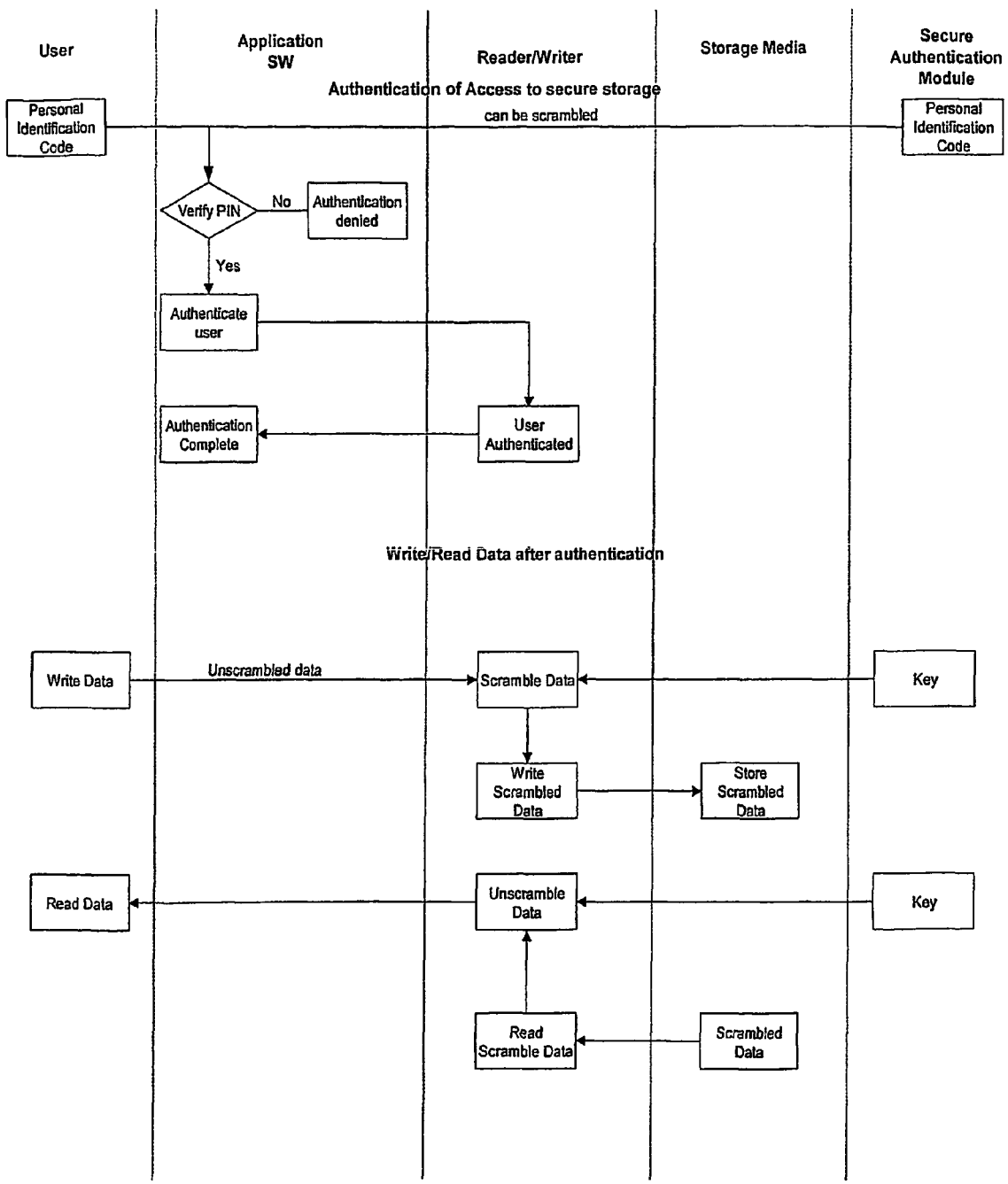
FIG. 10 is a command flow diagram for the device according to the preferred embodiment of the invention.

FIG. 10 shows the self-explanatory command flow for the secure digital media reader, with a secure authentication module (SAM) being provided by the smart card.

It has to be understood that the above detailed description refers to a preferred embodiment of the invention. However, the invention is not limited to this embodiment as there are various other embodiments possible within the scope of the accompanying claims which are apparent to a person skilled in the art. For example, the digital media reader may be a device capable of accessing digital media contents from one of the following data sources: a hard disk, a removable disk, a CD, a DVD, a flash memory, the internet. Further, instead of a smart card reader, any reader capable of reading and transmitting an authentication information may be used, like a reader capable of retrieving biometric information from a user, e.g. a reader including a fingerprint sensor, or an iris, face or voice recognition means.

The invention claimed is:

1. A device for secure access to digital media contents, the device comprising:
    a digital media reader for accessing digital media contents from a data source loaded into the digital media reader, the digital media reader located in a single housing, wherein the data source comprises a hard disk, a removable disk, a CD, a DVD, a flash memory embedded inside the device, or a removable flash memory and the digital media contents include one or more of: digital video, digital audio, and digital still pictures;
    a smart card reader for controlling access to the digital media contents, the smart card reader located in the single housing;
    an internal communication path between the digital media reader and the smart card reader, the internal communication path being not directly accessible from outside the device; and
    a multi-interface driver connected to the digital media reader and the smart card reader, the driver capable of reporting at least two logical interfaces to a host via a single electrical interface and converting commands received from the host into a different format before transmitting the commands to the smart card reader.

2. The device according to claim 1, wherein the at least two logical interfaces include a first logical interface being compatible to the digital media and a second logical interface being compatible to authentication data used by the smart card reader.

3. The device according to claim 2, wherein the single electrical interface is designed according to one of the following standards: USB, SCSI, Firewire, PCMCIA, WiFi, Bluetooth, HyperLAN.

4. The device according to claim 1, wherein the digital media reader and the smart card reader share a common processing unit.

5. The device according to claim 1, wherein the digital media reader and the smart card reader use different processing units, the communication path including a communication channel between the processing units.

6. The device according to claim 1, wherein the smart card reader is capable of accessing a key stored on a smart card.

7. The device according to claim 6, further comprising, means for entering a PIN code and releasing the key after a PIN code match is determined.

8. The device according to claim 6, wherein the smart card containing the key is interfaced to the smart card reader through one of the following interfaces: ISO 7816, 12C, Contactless Smart Card Interface.

9. The device according to claim 6, wherein the smart card is embedded inside the smart card reader.

10. The device according to claim 1, wherein the smart card reader includes a device for retrieving biometric information from the user.

11. The device according to claim 10, wherein the device for retrieving biometric information includes one of the following: a fingerprint sensor, an iris recognition device, a face recognition device, a voice recognition device.

12. The device according to claim 1, wherein the data source is one of the following: a hard disk, a removable disk, a CD, a DVD, a flash memory embedded inside the device, a removable flash memory.

13. The device according to claim 1, wherein the digital media reader includes a modem capable of retrieving data from a remote network.

14. The device according to claim 1, wherein the single housing is a module that is insertable into and removable from the device.

15. The device according to claim 1, wherein at least one of the digital media reader and the smart card reader is a system-on-chip (SOC) or a single chip system.

* * * * *

UNITED STATES PATENT AND TRADEMARK OFFICE
CERTIFICATE OF CORRECTION

PATENT NO. : 8,745,754 B2  
APPLICATION NO. : 10/573147  
DATED : June 3, 2014  
INVENTOR(S) : Rao B. S. Bhaskar et al.

It is certified that error appears in the above-identified patent and that said Letters Patent is hereby corrected as shown below:

Title Page, item (30), Foreign Application Priority Data after "203 14 722" add --.7--

Signed and Sealed this  
Thirtieth Day of September, 2014

Michelle K. Lee  
*Deputy Director of the United States Patent and Trademark Office*